US007958988B2

(12) United States Patent
Miyamoto

(10) Patent No.: US 7,958,988 B2

(45) Date of Patent: Jun. 14, 2011

(54) CONVEYING DEVICE AND IMAGE FORMING APPARATUS

(75) Inventor: Satoru Miyamoto, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 14 days.

(21) Appl. No.: 12/081,677

(22) Filed: Apr. 18, 2008

(65) Prior Publication Data

US 2008/0283369 A1 Nov. 20, 2008

(30) Foreign Application Priority Data

May 14, 2007 (JP) ................................ 2007-127619

(51) Int. Cl.

| | |
|---|---|
| ***H04N 1/04*** | (2006.01) |
| ***B65H 5/08*** | (2006.01) |
| ***G03G 21/20*** | (2006.01) |
| ***B65B 15/00*** | (2006.01) |
| ***B65B 17/00*** | (2006.01) |

(52) U.S. Cl. .................. 198/689.1; 198/836.1; 198/804; 399/92; 399/94; 271/11; 358/474

(58) Field of Classification Search ........................ None
See application file for complete search history.

(56) References Cited

U.S. PATENT DOCUMENTS

| | | | | |
|---|---|---|---|---|
| 2,813,637 | A * | 11/1957 | Perry et al. | 414/791.1 |
| 5,518,854 | A * | 5/1996 | Yu et al. | 430/133 |
| 6,695,504 | B2 * | 2/2004 | Matsumoto | 400/635 |
| 7,126,726 | B2 * | 10/2006 | Takei et al. | 358/474 |

FOREIGN PATENT DOCUMENTS

| | | | |
|---|---|---|---|
| JP | 54-059146 | | 5/1979 |
| JP | 54059146 | A * | 5/1979 |
| JP | 04-013265 | | 1/1992 |
| JP | 05-134499 | | 5/1993 |
| JP | 07-333916 | | 12/1995 |
| JP | 11-202645 | | 7/1999 |
| JP | 11202645 | A * | 7/1999 |
| JP | 2002-351257 | | 12/2002 |
| JP | 2006-001686 | | 1/2006 |
| JP | 2006001686 | A * | 1/2006 |
| JP | 2006-076712 | | 3/2006 |
| JP | 2007-004117 | | 1/2007 |

* cited by examiner

*Primary Examiner* — Gene Crawford
*Assistant Examiner* — Yolanda Cumbess
(74) *Attorney, Agent, or Firm* — Harness, Dickey & Pierce, P.L.C.

(57) ABSTRACT

A conveying device includes a guiding member that has a contact portion that comes into contact with an inner peripheral surface of a conveying belt in which a plurality of suction holes is formed, and an endless conveying belt that has ridges to hold a recording medium lest the recording medium come into contact with the suction holes. A plurality of slits is formed in the contact portion to attract the recording medium to the endless conveying belt through the suction holes. The slits are formed to prevent the conveying belt from falling in the slits when the conveying belt is pressed due to suction.

23 Claims, 6 Drawing Sheets

CONVEYING DEVICE AND IMAGE FORMING APPARATUS

CROSS-REFERENCE TO RELATED APPLICATIONS

The present application claims priority to and incorporates by reference the entire contents of Japanese priority document 2007-127619 filed in Japan on May 14, 2007.

BACKGROUND OF THE INVENTION

1. Field of the Invention

The present invention relates to a conveying device that conveys a recording medium and an image forming apparatus that includes the conveying device.

2. Description of the Related Art

For example, Japanese Patent Application Laid-open No. H5-134499 and Japanese Patent Application Laid-open No. 2006-1686 disclose a conventional conveying device that conveys a recording medium with an unfixed image to a fixing unit of an image forming apparatus. Copiers and printers are examples of such an image forming apparatus.

In a typical image forming apparatus, an image carried on an image carrier such as an intermediate transfer belt is transferred onto the recording medium at an image transfer unit. The recording medium on which the unfixed image is carried is conveyed to the fixing unit by a conveying belt, which is a part of the conveying device. After the image on the recording medium is fixed by the fixing unit, the recording medium is discharged outside the image forming apparatus. When the conveying belt conveys a recording medium, measures are taken so that the recording medium adheres to the conveying belt. Such measures include absorbing air through a plurality of suction holes (air holes) arranged in the conveying belt so that the recording medium firmly adheres to the conveying belt due to suction force. Because the recording medium firmly adheres to the conveying belt, image distortion is prevented that could be caused because the unfixed image on the recording medium is scraped against parts of the conveying path.

Japanese Patent Examined Publication No. H4-13265 discloses a conventional technology in which minute asperity is formed on a surface of a conveying belt to enhance its frictional properties with respect to recording media.

In the conventional technology, however, uneven gloss may be caused on an image in the fixing process due to the presence of portions with and without the suction holes in the conveying belt.

The inventor has led to the following results after a strenuous study to address the above problems.

First, the chances of occurrence of uneven gloss are higher when an inner peripheral surface of the conveying belt is located significantly away from a guiding member. In other words, in the conventional conveying devices, a large opening (communicated to a suction path formed by a suction fan) is arranged below a conveying surface of the conveying belt to absorb air through the suction holes. Due to the presence of such a large opening, the inner peripheral surface of the conveying belt is located significantly away from a guiding member, thereby increasing the chances of occurrence of uneven gloss.

In addition, uneven gloss is also caused when the recording medium comes into close contact with the suction holes. In the conventional conveying devices, because air is sucked through the suction holes, the recording medium comes into close contact with the suction holes, thereby increasing the chances of occurrence of uneven gloss.

Based on the above discussion, the inventors concluded that uneven gloss is generated due to a change in the potential of an image carried on a recording medium at the positions of the suction holes.

SUMMARY OF THE INVENTION

It is an object of the present invention to at least partially solve the problems in the conventional technology.

According to an aspect of the present invention, there is provided a conveying device that conveys a recording medium configured to carry an unfixed image on an image formation surface. The conveying device includes an endless conveying belt provided with a plurality of suction holes to attract the recording medium to the endless conveying belt by suction force, that is opposed to a non-image formation surface of the recording medium, and that conveys the recording medium to a fixing unit; and a guiding member that includes a contact portion that is in contact with an inner peripheral surface of the endless conveying belt; and a plurality of through holes formed in the contact portion to attract the recording medium to the endless conveying belt by suction force, the through holes being formed to prevent the endless conveying belt from falling in the through holes when the endless conveying belt is pressed against the guiding member due to suction force.

According to another aspect of the present invention, there is provided a conveying device conveying device that conveys a recording medium configured to carry an unfixed image on an image formation surface. The conveying device includes an endless conveying belt provided with a plurality of suction holes to attract the recording medium to the endless conveying belt by suction force, that is opposed to a non-image formation surface of the recording medium, and that conveys the recording medium to a fixing unit, the endless conveying belt including a plurality of ridges that comes into contact with a recording medium to prevent the recording medium from coming into contact with the suction holes.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
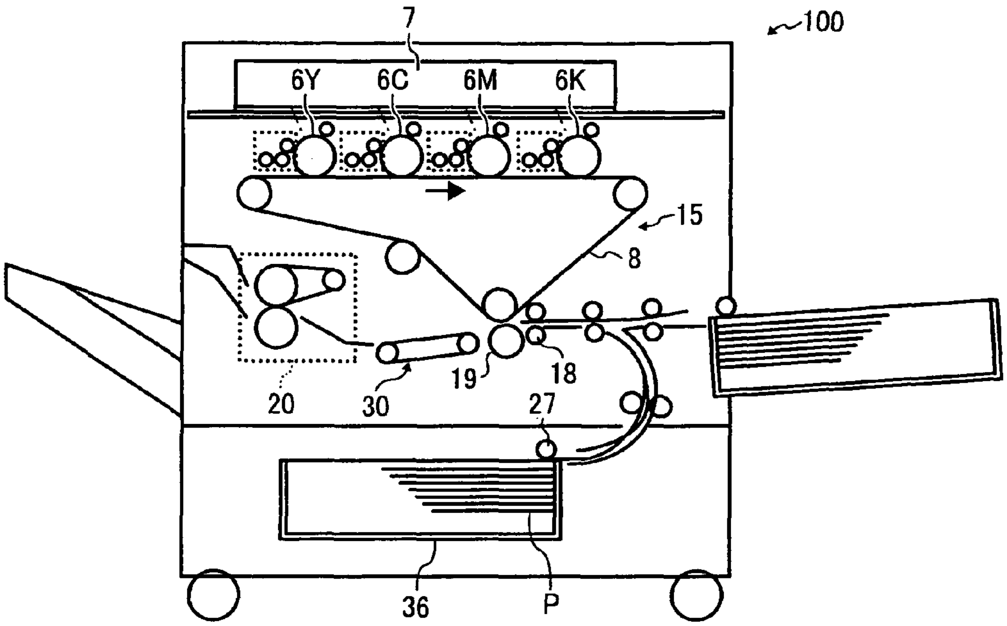
FIG. 1 is a schematic diagram of an image forming apparatus according to a first embodiment of the present invention.

Exemplary embodiments of the present invention are explained in detail below with reference to the accompanying drawings. The same reference numerals are given to the same or equivalent components in the drawings, and an overlapped explanation thereof is appropriately simplified or omitted.

In the following explanation, "an image formation surface" means a surface of a recording medium with an unfixed toner image and "a non-image formation surface" means a surface of the recording medium without an unfixed toner image. When an image is formed on both sides of a recording medium, "a non-image formation surface" in one-side printing (forming an image on a first side of the recording medium) means a surface without an unfixed toner image and "a non-image formation surface" in double-side printing (forming an image on a second side of the recording medium) means a surface with a fixed toner image.

Figure 2:
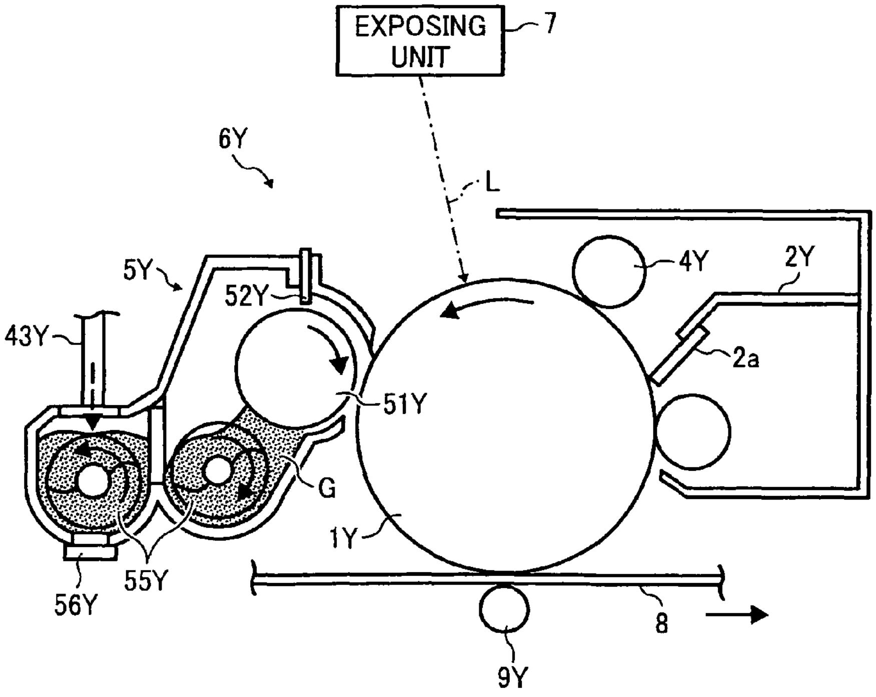
FIG. 2 is a schematic diagram of an image forming unit for yellow shown in FIG. 1.

FIG. 1 is a schematic diagram of an image forming apparatus 100 according to a first embodiment of the present invention, and FIG. 2 is a schematic enlarged diagram of an image forming unit for yellow. The image forming apparatus 100 is, for example, a printer As shown in FIG. 1, an intermediate transfer belt unit 15 is arranged at a center of a main body of the image forming apparatus 100. Image forming units 6Y, 6M, 6C, and 6K corresponding to each color (yellow, magenta, cyan, and black) are arranged in parallel to be opposed to an intermediate transfer belt 8 of the intermediate transfer belt unit 15. A conveying device 30 is arranged below the intermediate transfer belt unit 15.

As shown in FIG. 2, the image forming unit 6Y corresponding to yellow includes a photosensitive drum 1Y serving as an image carrier, a charging unit 4Y arranged around the photosensitive drum 1Y, a developing unit 5Y, a cleaning unit 2Y, and a neutralizing unit (not shown). An image forming process (charging, exposing, developing, transferring, and cleaning) is performed to form a yellow image on the photosensitive drum 1Y.

The other three image forming units 6M, 6C, and 6K are configured in the same way as the image forming unit 6Y corresponding to yellow except that a color of used toner is different. An image corresponding to each toner color is formed. An explanation of the other three image forming units 6M, 6C, and 6K is appropriately simplified below and only the image forming unit 6Y corresponding to yellow is explained.

As shown in FIG. 2, the photosensitive drum 1Y is driven with rotation of a driving motor (not shown) in a counterclockwise direction. A surface of the photosensitive drum 1Y is uniformly charged at a position of the charging unit 4Y (charging).

Then, the surface of the photosensitive drum 1Y moves to a position to which a laser beam L corresponding to yellow from an exposing unit 7 is emitted. The surface of the photosensitive drum 1Y is then scanned with the laser beam L whereby an electrostatic latent image corresponding to yellow is formed on the surface of the photosensitive drum 1Y (exposing).

Then, the latent image is developed on the surface of the photosensitive drum 1Y that is opposed to the developing unit 5Y to form a yellow toner image (an image) (developing).

The surface of the photosensitive drum 1Y reaches a position opposed to both of the intermediate transfer belt 8 and a transfer roller 9Y where the toner image on the photosensitive drum 1Y is transferred onto the intermediate transfer belt 8 (a primary transfer process). At this time, untransferred toner slightly remains on the photosensitive drum 1Y.

The surface of the photosensitive drum 1Y reaches a position opposed to the cleaning unit 2Y where the untransferred toner remaining on the photosensitive drum 1Y is collected by a cleaning blade 2*a* into the cleaning unit 2Y (cleaning).

The surface of the photosensitive drum 1Y finally reaches a position opposed to the neutralizing unit where remaining potential on the photosensitive drum 1Y is removed.

Thus, a series of image forming processes performed on the photosensitive drum 1Y end.

The image forming processes are also performed in the other three image forming units 6M, 6C, and 6K in the same way as in the yellow image forming unit 6Y. Specifically, a lased beam L from the exposing unit 7 arranged above each of the image forming units based on image information is emitted to each of the photosensitive drums 1M, 1C, and 1K. More specifically, the exposing unit 7 emits a laser beam L from a light source. The laser beam L is emitted through a plurality of optical elements to the photosensitive drum while the laser beam L is deflected by a polygon mirror that is rotating.

Toner images with a different color that are formed on the photosensitive drums through the developing process are superimposed on and transferred onto the intermediate transfer belt 8 serving as an image carrier. Thus, a color image is formed on the intermediate transfer belt 8.

Figure 3:
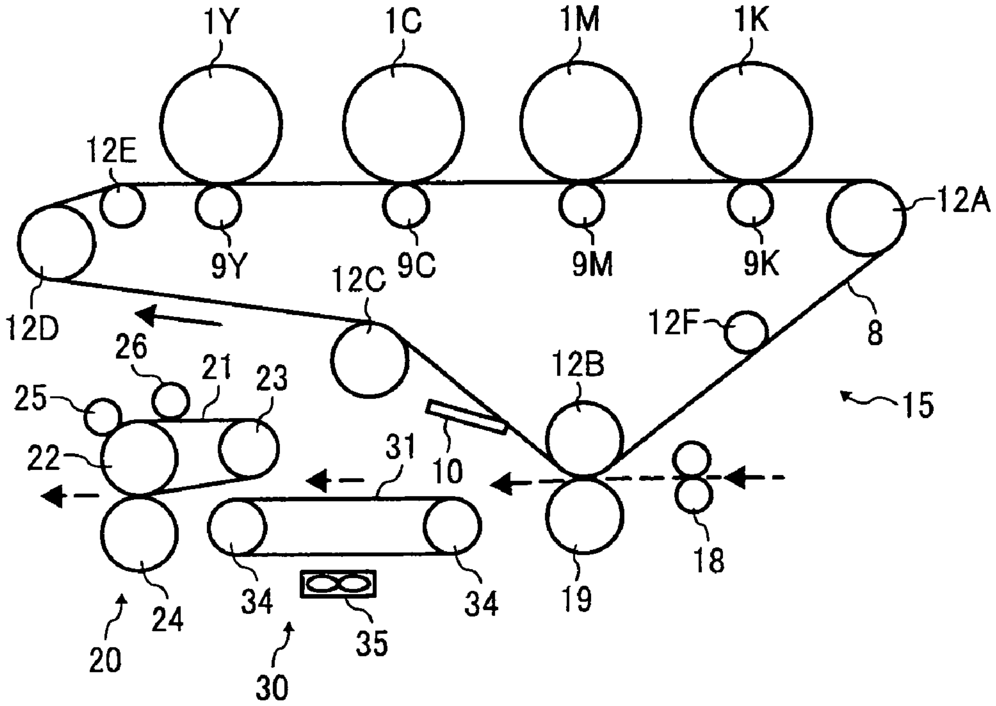
FIG. 3 is a schematic diagram of a conveying device and its neighborhood shown in FIG. 1.

As shown in FIG. 3, the intermediate transfer belt unit 15 includes the intermediate transfer belt 8, four transfer rollers 9Y, 9M, 9C, and 9*k*, a driving roller 12A, an opposing roller 12B, tension rollers 12C to 12F, and an intermediate transfer cleaning unit 10. The intermediate transfer belt 8 is stretched over and supported by the rollers 12A to 12F and is endlessly moved by rotation of the driving roller 12A as indicated by an arrow in FIG. 3.

The intermediate transfer belt 8 is held between the transfer rollers 9Y, 9M, 9C, and 9*k* and the photosensitive drums 1Y, 1M, 1C, and 1K to form first transfer nips therebetween, respectively. A transfer voltage (a transfer bias) having a polarity opposite to a toner polarity is applied to the transfer rollers 9Y, 9M, 9C, and 9*k*.

The intermediate transfer belt 8 moves in the direction indicated by the arrow and passes through the first transfer nips in turn. Thus, toner images with a different color on the photosensitive drums 1Y, 1M, 1C, and 1K are superimposed on and are primarily transferred onto the intermediate transfer belt 8.

Then, the transferred toner image on the intermediate transfer belt 8 reaches a position that is opposed to a secondary transfer roller 19 (an image transfer unit). At this position, the intermediate transfer belt 8 is held between the opposing roller 12B and the secondary transfer roller 19 to form a secondary transfer nip (the image transfer unit). The toner image with four colors formed on the intermediate transfer belt 8 is transferred onto a recording medium P such as a printing sheet conveyed to the secondary transfer nip. At this time, toner that has not been transferred onto the recording medium P remains on the intermediate transfer belt 8.

The toner on the intermediate transfer belt 8 reaches the intermediate transfer cleaning unit 10 where the untransferred toner is removed.

Thus, a series of transfer processes performed on the intermediate transfer belt 8 end.

As shown in FIG. 1, the recording medium P conveyed to the secondary transfer nip is fed from a feeding unit 36 (or a feeding unit laterally arranged) arranged at a lower portion of the image forming apparatus 100 through a feeding roller 27 and registration rollers 18.

Specifically, a plurality of recording media P is stacked in the feeding unit 36. When the feeding roller 27 is driven by counterclockwise rotation, an uppermost recording medium P is fed through a conveying path to the registration rollers 18.

The recording medium P conveyed to the registration rollers 18 is conveyed to the secondary transfer nip to synchronize with a color image on the intermediate transfer belt 8. Thus, a desired color image is transferred onto the recording medium P.

The recording medium P onto which the color image (an unfixed image) is transferred at the secondary transfer nip is conveyed to a fixing unit 20 through a conveying device 30.

The color image transferred onto a surface of the recording medium P is fixed by heat and pressure of a fixing belt 21 and a pressing roller 24 at the fixing unit 20.

As shown in FIG. 3, the fixing unit 20 includes the fixing belt 21, a fixing assist roller 22, a heating roller 23, the pressing roller 24, a cleaning roller 25, and an oil coating roller 26. The heating roller 23 is configured to be hollow inside and a heater is arranged in its inside. Therefore, the fixing belt 21 is heated by the heater. The pressing roller 24 is brought into close contact with the fixing assist roller 22 through the fixing belt 21. A nip through which a recording medium P is inserted is formed between the pressing roller 24 and the fixing assist roller 22. Oil is coated on the fixing belt 21 by the oil coating roller 26 impregnated with silicon oil to enhance a toner releasing property on a surface of the fixing belt 21. The cleaning roller 25 is in contact with the fixing belt 21 and removes matter adhering to the fixing belt 21 such as toner.

The recording medium P after the fixing process is discharged outside of the image forming apparatus by a pair of discharging rollers (not shown). Transferred recording media P discharged by the discharging rollers are sequentially stacked on a stacking unit as an output image.

Thus, a series of image forming processes in the image forming apparatus have completed. A process line speed in the image forming apparatus (a traveling speed of the intermediate transfer belt 8 or a speed at which a recording medium P is conveyed) according to the first embodiment is set to about 400 millimeters per second.

As shown in FIG. 2, the developing unit 5Y includes a developing roller 51Y opposed to the photosensitive drum 1Y, a doctor blade 52Y opposed to the developing roller 51Y, two conveying screws 55Y arranged in a developer container, a toner replenishing path that communicates with the developer container through its opening, and a concentration detecting sensor 56Y that detects a toner concentration in a developer. The developing roller 51Y includes a magnet that is fixedly arranged to its inside. A sleeve rotates around the developing roller 51Y. A two-component developer obtained by mixing carrier and toner is contained in the developer container.

The sleeve rotates in a direction indicated by an arrow shown in FIG. 2. A developer carried on the developing roller 51Y based on a magnetic field formed by the magnet moves on the developing roller 51Y with rotation of the sleeve. The developer in the developing unit 5Y is adjusted in such a manner that a toner ratio (toner concentration) of the developer is set to be in a predetermined range.

While mixed and stirred with the developer by the two conveying screws 55Y, toner supplied to the developer container circulates in two of the separated developer containers (movement of a vertical direction with respect to a sheet surface of FIG. 2). The toner in the developer adheres to carrier based on frictional charge, and is carried on the developing roller 51Y with the carrier by a magnetic force formed on the developing roller 51Y.

The developer carried on the developing roller 51Y is moved in the direction indicated by the arrow shown in FIG. 2, reaches the doctor blade 52Y at which an amount of the developer is properly adjusted, and then, is carried to a position (a developed area) opposite to the photosensitive drum 1Y. Then, the toner is adhered to a latent image formed on the photosensitive drum 1Y based on an electric field formed on the developed area. The developer that remains on the developing roller 51Y reaches an upper portion of the developer container along with rotation of the sleeve where the developer is removed from the developing roller 51Y.

Figure 4:
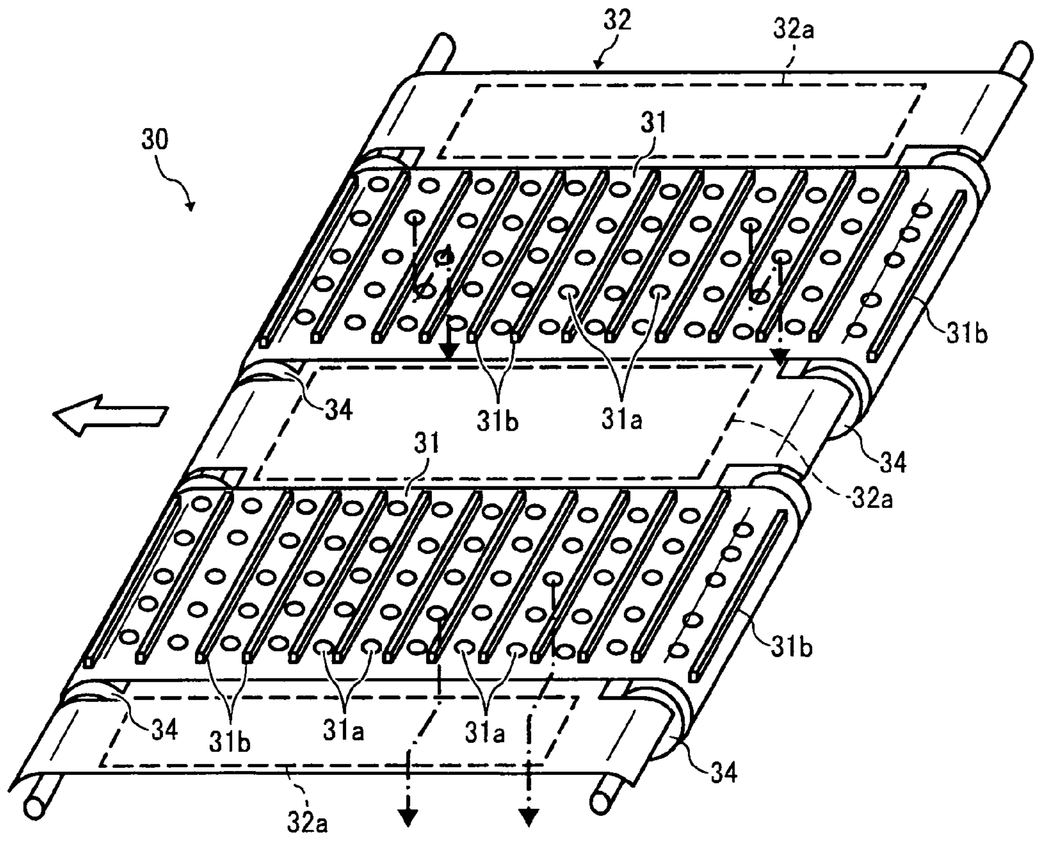
FIG. 4 is a perspective view of the conveying device shown in FIG. 3.
Figure 5:
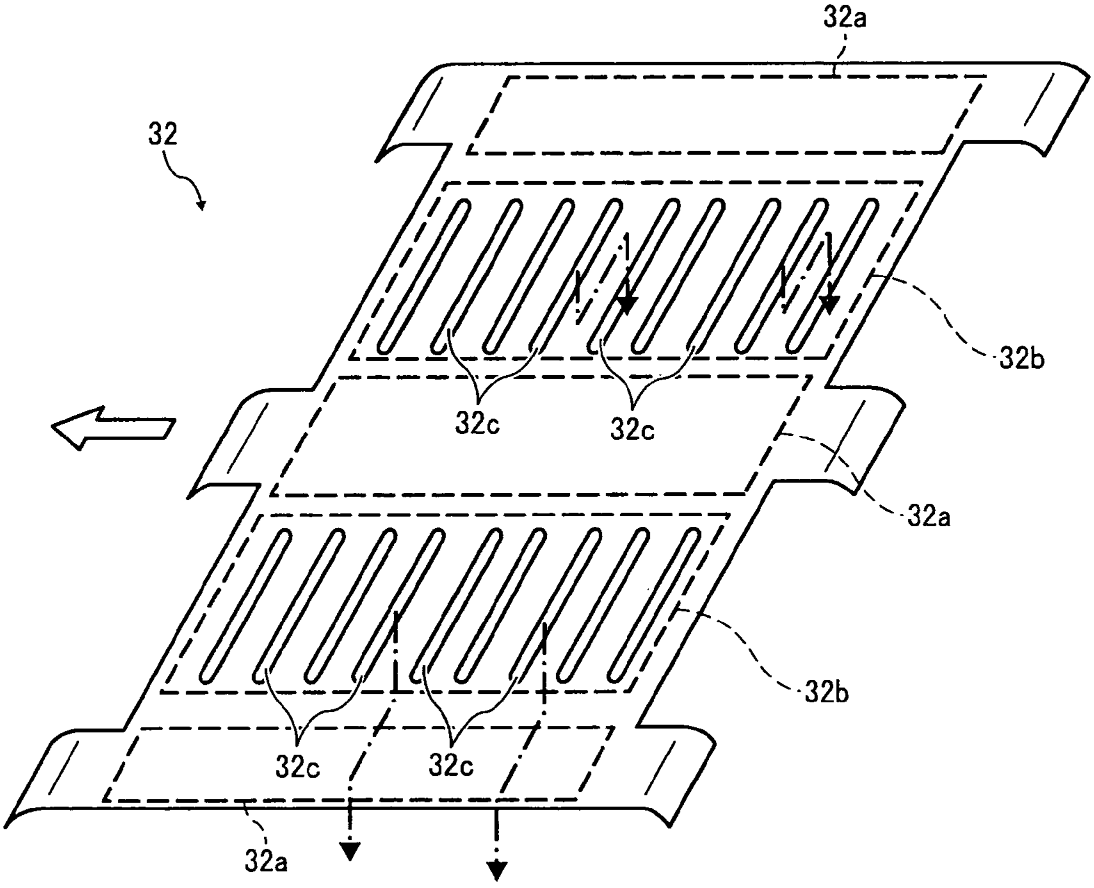
FIG. 5 is a perspective view of a guiding member shown in FIG. 4.

FIG. 3 is a schematic diagram of the conveying device 30 and its neighborhood. FIG. 4 is a perspective view of a portion of the conveying device 30. FIG. 5 is a perspective view of a guiding member 32 and explains a state in which conveying belts 31 and rollers 34 are taken away from the conveying device 30 shown in FIG. 4.

As shown in FIG. 3, the conveying device 30 is arranged on a downstream side of the image transfer unit (the secondary transfer nip) and on an upstream side of the fixing unit 20. A recording medium P (an unfixed image is carried on its image formation surface) after a transfer process and before a fixing process is conveyed to the fixing unit 20 while the recording medium P is attracted to the conveying belt 31 through a suction force from a suction fan 35.

As shown in FIG. 4, the conveying device 30 includes the conveying belt 31, the guiding member 32, the roller 34, the suction fan 35, a housing (not shown), and a driving unit (not shown).

The conveying belt 31 includes two conveying belts 31 are arranged around the guiding member 32. Each of the conveying belt 31 is made of ethylene-propylene rubber (EP rubber) and it is an endless belt that carries a recording medium P in a direction indicated by a white arrow, opposed to a non-image formation surface (different from an image formation surface on which an unfixed image is carried) of the recording medium P. Specifically, the conveying belts 31 are stretched over and supported by the two rollers 34 and are driven with rotation of one of the rollers 34 that is coupled to a driving unit to travel in the white-arrow direction. A shaft of the roller 34 is rotatably supported, although not shown, to the housing of the conveying device 30 through a bearing.

As shown in FIG. 4, a plurality of suction holes 31*a* (air holes) is formed in the conveying belt 31 to attract (absorb) a recording medium P that is being conveyed. A suction path indicated by a one-dot chain line is formed by the suction fan 35 arranged below the conveying belt 31 along a wall (not shown) of the housing arranged below a conveying surface of the conveying belt 31.

Specifically, air sucked from the suction holes 31*a* moves downward through a plurality of slits 32*c* (see FIG. 5) formed in a contact portion 32*b* of the guiding member 32. Then, the suctioned air moves in a width direction of the conveying belt 31 along the wall, more downward, and is discharged outside the conveying device 30 through the suction fan 35.

Ridges 31*b* (a rib) are arranged in parallel on the conveying belt 31 at a predetermined distance in the width direction of the conveying belt 31. In other words, the ridges 31*b* are formed like a caterpillar. Specifically, a distance (a pitch) between adjacent ridges 31*b* is set to 1 millimeter and a height of the ridge 31*b* is set to 0.4 millimeter to 0.5 millimeter (preferably about 1 millimeter).

Thus, the ridges 31*b* are formed on the conveying surface (an outer peripheral surface) of the conveying belt 31, so that a recording medium P is held (attracted) by and conveyed on the ridges 31*b* without coming into contact with the suction holes 31*a*. The inventor experimentally confirmed that this configuration prevents a potential of an image carried on a recording medium P from changing due to the presence of the suction holes 31*a* and uneven gloss corresponding to the suction holes 31*a* from being caused on an output image after a fixing process.

A volume resistivity of the conveying belt 31 is set to $10^{12}\Omega\cdot$cm or more. Specifically, the conveying belt 31 is formed for its volume resistivity to be $10^{14}$ to $10^{15}\Omega\cdot$cm. The inventor experimentally confirmed that when the volume resistivity of the conveying belt 31 is set relatively high as described above, a potential of an image carried on a recording medium P is prevented from changing due to the suction holes 31*a*. Furthermore, uneven gloss due to the presence of the suction holes 31*a* is hardly caused on an output image after a fixing process.

As shown in FIG. 5, the guiding member 32 includes a guiding portion 32*a* opposed to a non-image formation surface of a recording medium and the contact portion 32*b* coming into contact (sliding contact) with an inner peripheral surface of the conveying belt 31 both of which are integrally formed on the same plane.

The guiding member 32 is made of metal such as a zinc-treated steel plate (SECC) and it is electrically grounded to earth. This prevents an image on a recording medium from being damaged due to an electric charge accumulated on the guiding member 32, which is caused by sliding contact of the recording medium P or the conveying belt 31 with the guiding member 32.

The slits 32*c* are formed in the contact portion 32*b* of the guiding member 32 to attract a recording medium P through the suction holes 31*a* of the conveying belt 31. Specifically, the slits 32*c* are formed to be long in the width direction of the conveying belt 31 and are arranged in parallel with an almost similar pitch in a direction in which a recording medium is conveyed.

The slits 32*c* are formed in such a manner that, when the conveying surface of the conveying belt 31 is pressed due to suction, the conveying belt 31 does not fall in the slits 32*c*. In other words, an opening area of each of the slits 32*c* is not large, and an area on the contact portion 32*b* to come into contact with and hold the conveying belt 31 is sufficiently secured. Specifically, a total opening area of the slits 32*c* is smaller than a total area of the contact portion 32*b* that comes into contact with the inner peripheral surface of the conveying belt 31. This configuration prevents the conveying belt 31 (particularly suction holes 31*a*) from being seriously deformed even if an attractive force from the suction fan 35 is large.

The inventor experimentally confirmed that, when the conveying device 30 that has this configuration is used, compared with a case in which a slit large enough for a conveying belt to fall in the slit, when the conveying belt is pressed due to suction, is formed in a guiding member, a potential of an image carried on a recording medium P is prevented from changing due to the suction holes 31*a*. Furthermore, uneven gloss due to the presence of the suction holes 31*a* is hardly caused on an output image after a fixing process.

The inventor experimentally confirmed that, when the uneven gloss is prevented, it is especially effective to use a fixing method in which silicon oil is coated on the fixing belt 21 and to use toner suitable for the fixing method (toner especially compatible with the fixing method of supplying silicon oil to the fixing belt 21).

Specifically, known toner, for example, disclosed in Japanese Patent Application Laid-open No. 2004-53953 or Japanese Patent Application Laid-open No. 2000-137351 can be employed.

As described above, the conveying device 30 is configured in such a manner that the inner peripheral surface of the conveying belt 31 is brought into contact with the guiding member 32 and that a recording medium P is not brought into contact with the suction holes 31*a*. Therefore, it is possible to prevent uneven gloss due to the presence of the suction holes 31*a* from being caused on an output image.

Figure 6:
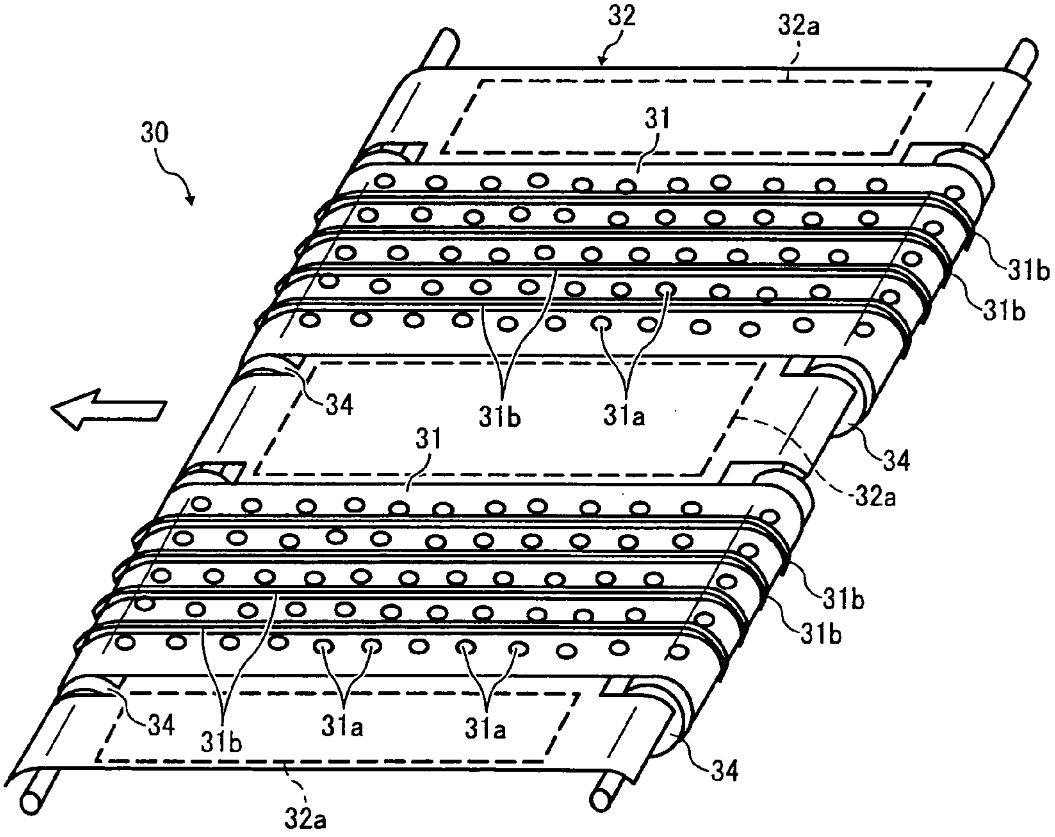
FIG. 6 is a perspective view of a conveying device according to a second embodiment of the present invention.

FIG. 6 is a perspective view of the conveying device 30 according to a second embodiment of the present invention and corresponds to the conveying device 30 shown in FIG. 4. The conveying device 30 is different from the conveying device according to the first embodiment in a shape of the ridge 31*b* on the conveying belt 31.

In the same way as in the conveying device according to the first embodiment, the guiding member 32 is brought into contact with the inner peripheral surface of the conveying belt 31 and an opening area of each of the slits 32*c* in the guiding member 32 is relatively small, so that an area of the guiding member 32 obtained by coming into contact with and hold the conveying belt 31 is sufficiently secured in the conveying device 30.

Furthermore, the ridges 31*b* are also arranged on the conveying belt 31, so that a recording medium P that is being conveyed is prevented from coming into contact with the suction holes 31*a*.

The ridges 31*b* are arranged in parallel in a peripheral direction of the conveying belt 31 at a predetermined distance. Specifically, the distance between adjacent ridges 31*b* is set to about 1 millimeter and a height of the ridge 31*b* is set to 0.4 millimeter to 0.5 millimeter (preferably, about 1 millimeter).

As described above, it is possible, in the same way as in the first embodiment, to prevent uneven gloss due to the presence of the suction holes 31*a*.

Figure 7:
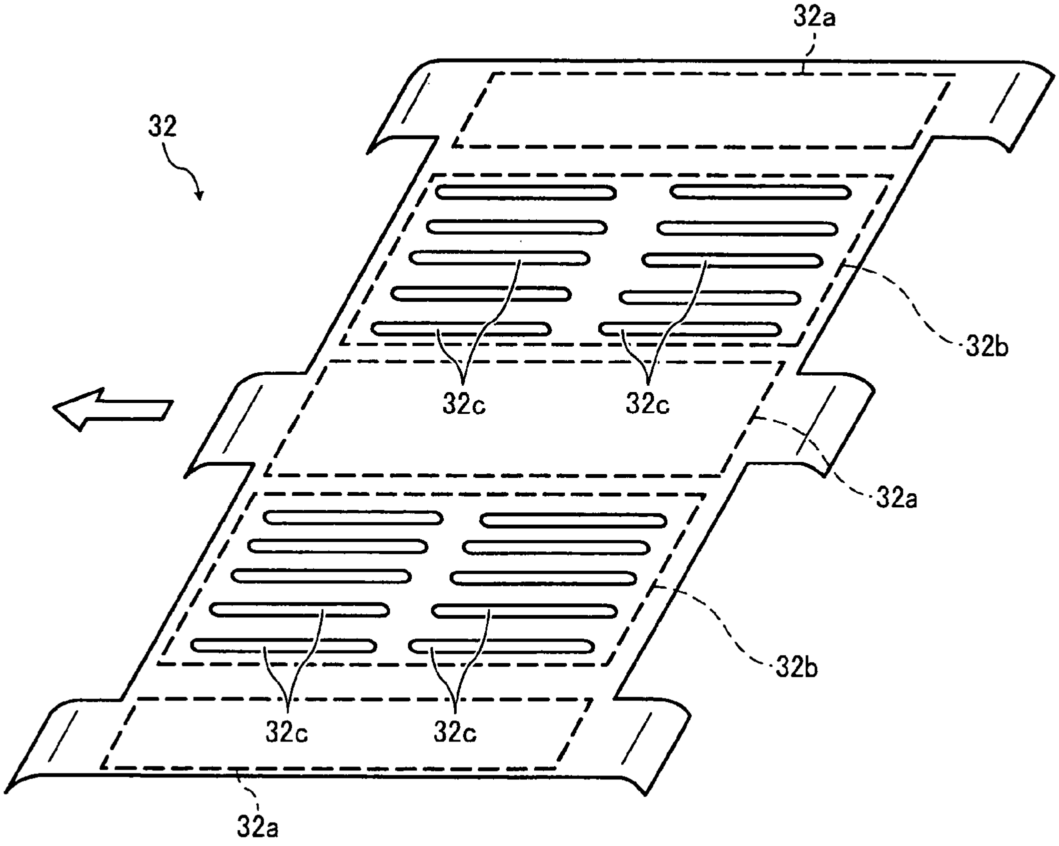
FIG. 7 is a perspective view of a guiding member according to a third embodiment of the present invention.

FIG. 7 is a perspective view of the guiding member 32 arranged in the conveying device 30 according to a third embodiment of the present invention and corresponds to the guiding member according to the first embodiment shown in FIG. 5. The guiding member 32 is different from the guiding member of the first embodiment in a shape of the slit 32*c*.

In the same way as in the conveying device of the first embodiment, the ridges 31*b* are arranged on the conveying belt 31 to prevent a recording medium P that is being conveyed from coming into contact with the suction holes 31*a*.

Furthermore, the guiding member 32 is brought into contact with the inner peripheral surface of the conveying belt 31 and an opening area of each of the slits 32*c* in the guiding member 32 is relatively small, so that an area of the guiding member 32 obtained by coming into contact with and holding the conveying belt 31 is also sufficiently secured.

The slit 32*c* of the guiding member 32 is formed to be long in a direction in which a recording medium P is conveyed. The slits 32*c* are arranged in parallel at a similar pitch in the peripheral direction of the conveying belt.

As described above, in the same way as in the first and second embodiments, the conveying device 30 is configured in such a manner that the inner peripheral surface of the conveying belt 31 is brought into contact with the guiding member 32 and that a recording medium P is not brought into contact with the suction holes 31*a* of the conveying belt 31. Therefore, it is also possible to prevent uneven gloss due to the presence of the suction holes 31*a*.

The embodiments of the present invention are applied to an image forming apparatus that uses an intermediate transfer element such as the intermediate transfer belt 8 serving as an image carrier and. However, similar technique can be applied to an image forming apparatus that uses a photosensitive element such as a photosensitive drum or a photosensitive belt as an image carrier. Moreover, similar technique can be applied to a conveying device that conveys a recording medium from a transfer conveying belt to a fixing unit. In those cases, it is also possible to obtain the same effects as in the embodiment of the present invention.

The number, position, and shape of the components are not limited to those described in the embodiments and can be changed as required.

According to an aspect of the present invention, it is possible to prevent occurrence of uneven gloss on an image due to the presence of the suction holes in the conveying belt.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A conveying device that conveys a recording medium configured to carry an unfixed image on an image formation surface, the conveying device comprising:

an endless conveying belt provided with a plurality of suction holes to attract the recording medium to the endless conveying belt by suction force, that is opposed to a surface of the recording medium without an unfixed toner image, and that conveys the recording medium to a fixing unit, the endless conveying belt being further provided with a plurality of ridges that comes into contact with the recording medium; and a guiding member that includes a contact portion that is in contact with an inner peripheral surface of the endless conveying belt, and a plurality of through holes formed in the contact portion to attract the recording medium to the endless conveying belt by suction force, the through holes being formed to prevent the endless conveying belt from falling in the through holes when the endless conveying belt is pressed against the guiding member due to suction force.

2. The conveying device according to claim 1, wherein the ridges are arranged in parallel at a predetermined distance in at least one of a circumferential direction and a width direction of the endless conveying belt.

3. The conveying device according to claim 2, wherein the predetermined distance between adjacent ridges in the circumferential direction is about 1.0 millimeter.

4. The conveying device according to claim 2, wherein the ridges have a height of about 1.0 millimeter.

5. The conveying device according to claim 2, wherein the ridges have a height of about 0.4 to about 0.5 millimeters.

6. The conveying device according to claim 1, wherein a total area of the through holes is smaller than a total area of the contact portion.

7. The conveying device according to claim 1, wherein the guiding member includes a guiding portion opposed to the surface of the recording medium without an unfixed toner image.

8. The conveying device according to claim 7, wherein the guiding portion and the contact portion are integrally formed on the same plane.

9. The conveying device according to claim 1, wherein the guiding member is made of metal and is electrically grounded to earth.

10. The conveying device according to claim 1, wherein a volume resistivity of the endless conveying belt is set to $10^{12}$ $\Omega\cdot$cm or more.

11. An image forming apparatus comprising the conveying device according to claim 1.

12. A conveying device that conveys a recording medium configured to carry an unfixed image on an image formation surface, the conveying device comprising:

an endless conveying belt provided with a plurality of suction holes to attract the recording medium to the endless conveying belt by suction force, that is opposed to a surface of the recording medium without an unfixed toner image, and that conveys the recording medium to a fixing unit, the endless conveying belt including a plurality of ridges that comes into contact with a recording medium.

13. The conveying device according to claim 12, wherein the ridges are arranged in parallel at a predetermined distance in at least one of a circumferential direction and a width direction of the endless conveying belt.

14. The conveying device according to claim 12, wherein a volume resistivity of the endless conveying belt is set to $10^{12}\Omega\cdot$cm or more.

15. An image forming apparatus comprising the conveying device according to claim 12.

16. The conveying device according to claim 13, wherein the predetermined distance between adjacent ridges in the circumferential direction is about 1.0 millimeter.

17. The conveying device according to claim 13, wherein the ridges have a height of about 1.0 millimeter.

18. The conveying device according to claim 13, wherein the ridges have a height of about 0.4 to about 0.5 millimeters.

19. An image forming apparatus comprising:

an image transfer unit that transfers a toner image onto an image formation surface of a recording medium;

a fixing unit that fixes the toner image on the recording medium; and a conveying device that is arranged on a downstream side of the image transfer unit and on an upstream side of the fixing unit and includes an endless conveying belt that conveys the recording medium while being in contact with a surface of the recording medium without an unfixed toner image, the endless conveying belt including a plurality of suction holes penetrating in its thickness direction to attract the recording medium to the endless conveying belt by suction force; and a plurality of ridges that is arranged in parallel at a predetermined distance in a circumferential direction of the endless conveying belt and comes into contact with the surface of the recording medium without an unfixed toner image.

20. The image forming apparatus according to claim 19, wherein a width of each of the ridges, which is in a recording medium conveying direction, is smaller than a diameter of each of the suction holes.

21. An image forming apparatus comprising:

an image transfer unit that transfers a toner image onto an image formation surface of a recording medium;

a fixing unit that fixes the toner image on the recording medium; and a conveying device configured to move a recording medium from the image transfer unit to the fixing unit, the conveying device including an endless conveying belt facing a surface of the recording medium without unfixed toner image, wherein the endless conveying belt includes concave and convex portions formed on a conveying surface of the endless conveying belt and extending in a direction perpendicular to or along a recording medium conveying direction of the conveying belt, and a plurality of suction holes configured to adhere the recording medium by suction force.

22. The image forming apparatus according to claim 21, wherein the suction holes are formed between the convex portions.

23. The image forming apparatus according to claim 21, wherein a width of each of the convex portions, which is in a recording medium conveying direction, is smaller than a diameter of each of the suction holes.

* * * * *